(12) United States Patent
Yamada et al.

(10) Patent No.: US 8,662,593 B2
(45) Date of Patent: Mar. 4, 2014

(54) FIXING DEVICE FOR HEADREST

(75) Inventors: Takuro Yamada, Tochigi (JP); Hiroshi Izawa, Tochigi (JP); Makoto Takeuchi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 15 days.

(21) Appl. No.: 13/133,529

(22) PCT Filed: Nov. 30, 2009

(86) PCT No.: PCT/JP2009/006478
§ 371 (c)(1),
(2), (4) Date: Jun. 8, 2011

(87) PCT Pub. No.: WO2010/067530
PCT Pub. Date: Jun. 17, 2010

(65) Prior Publication Data
US 2011/0248540 A1 Oct. 13, 2011

(30) Foreign Application Priority Data
Dec. 9, 2008 (JP) .................................. 2008-313678

(51) Int. Cl.
*A47C 7/36* (2006.01)
(52) U.S. Cl.
USPC .......................................... 297/410; 297/391
(58) Field of Classification Search
USPC ........................................ 297/37.8, 391, 410
See application file for complete search history.

(56) References Cited

U.S. PATENT DOCUMENTS

| | | | | |
|---|---|---|---|---|
| 5,667,279 A | * | 9/1997 | Christopher et al. | 299/1.9 |
| 6,331,027 B1 | * | 12/2001 | Wiedmayer | 296/37.8 |
| 6,761,409 B2 | * | 7/2004 | Ford | 297/410 |
| 6,969,118 B2 | * | 11/2005 | Yamada | 297/410 |
| 7,159,946 B2 | * | 1/2007 | Gurtatowski et al. | 297/410 |
| 2003/0205925 A1 | * | 11/2003 | Ford | 297/410 |
| 2003/0222491 A1 | * | 12/2003 | Isaacson | 297/410 |
| 2004/0145228 A1 | * | 7/2004 | Terrand et al. | 297/410 |
| 2005/0212343 A1 | * | 9/2005 | Katahira | 297/410 |
| 2006/0284468 A1 | * | 12/2006 | Tanaka | 297/410 |

FOREIGN PATENT DOCUMENTS

| | | |
|---|---|---|
| JP | 54-161715 U | 11/1979 |
| JP | 06-013603 U | 2/1994 |
| JP | 09-313292 A | 12/1997 |
| JP | 2008-119398 A | 5/2008 |

\* cited by examiner

*Primary Examiner* — David R Dunn
*Assistant Examiner* — Richard Lowry
(74) *Attorney, Agent, or Firm* — Drinker Biddle & Reath LLP (57) ABSTRACT

A fixing device is provided for a headrest that fixes the headrest at a predetermined position in an unadjustable manner, even after a guide lock is attached or even after a seatback is formed. At least one groove portion is formed by cutting out in a headrest pillar, without inclination in the radial direction. The fixing device has a knob portion, a resin spring portion formed continuously to the knob portion, and an engagement plate arranged in the knob portion, the resin spring portion is formed to extend on one side of the knob portion therefrom, and is provided with a space portion for expanding to surround the headrest pillar. The engagement plate is installed in the knob portion, and is formed in such a manner that part of the engagement plate is exposed in the space portion.

4 Claims, 8 Drawing Sheets

B-B sectional view

A-A sectional view understand # FIXING DEVICE FOR HEADREST

CROSS REFERENCE TO RELATED APPLICATIONS

This application is the U.S. national phase of the International Patent Application No. PCT/JP2009/006478 filed Nov. 30, 2009, which claims the benefit of Japanese Patent Application No. 2008-313678 filed Dec. 9, 2008, the entire content of which is incorporated herein by reference.

BACKGROUND

The invention relates to a fixing device for a headrest, particularly to a fixing device for a headrest for fixing a headrest stay at a predetermined position, so that the headrest is not adjustable.

Regulations on height requirements for headrests (Federal Motor Vehicle Safety Standard FMVSS202A) and the like require a headrest to be fixed to not drop from a use position.

Figure 8:
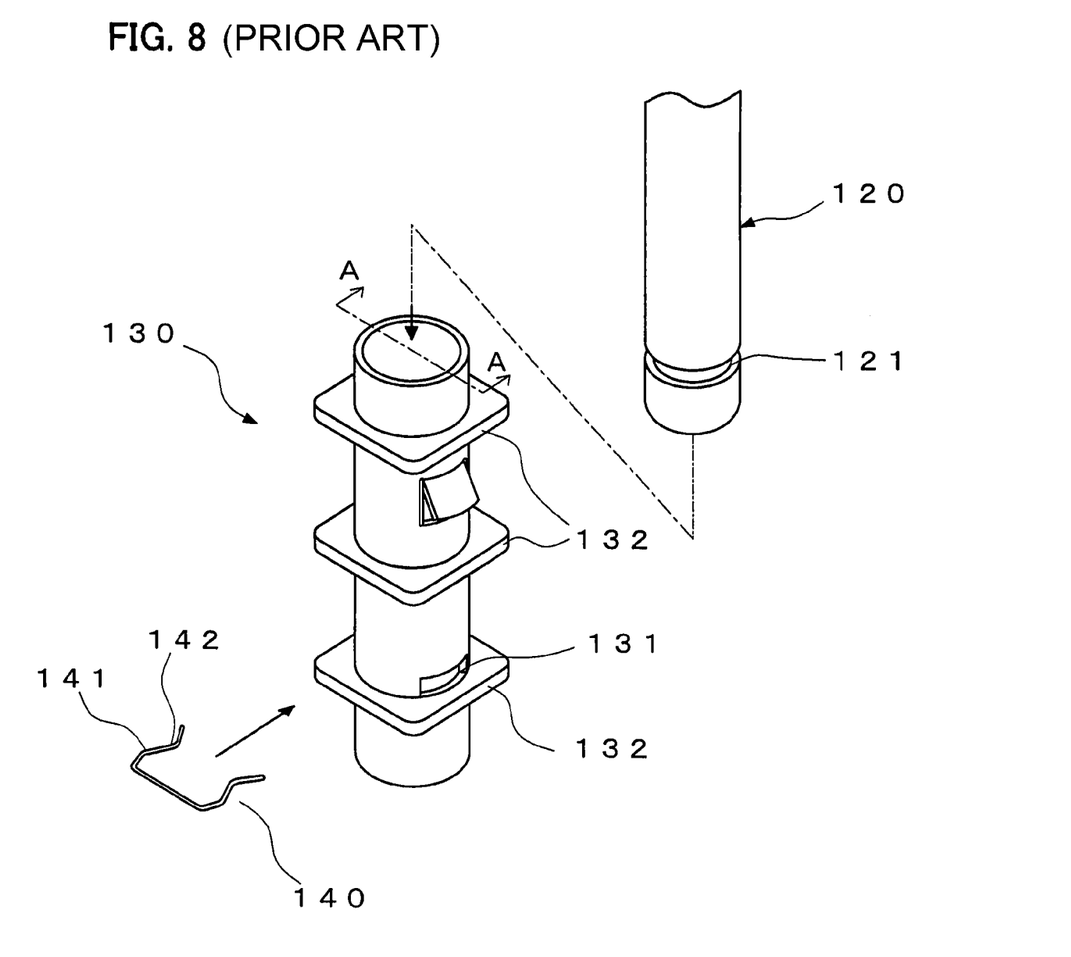
FIG. 8 is an exploded perspective view of a guide lock showing a conventional example.
Figure 9:
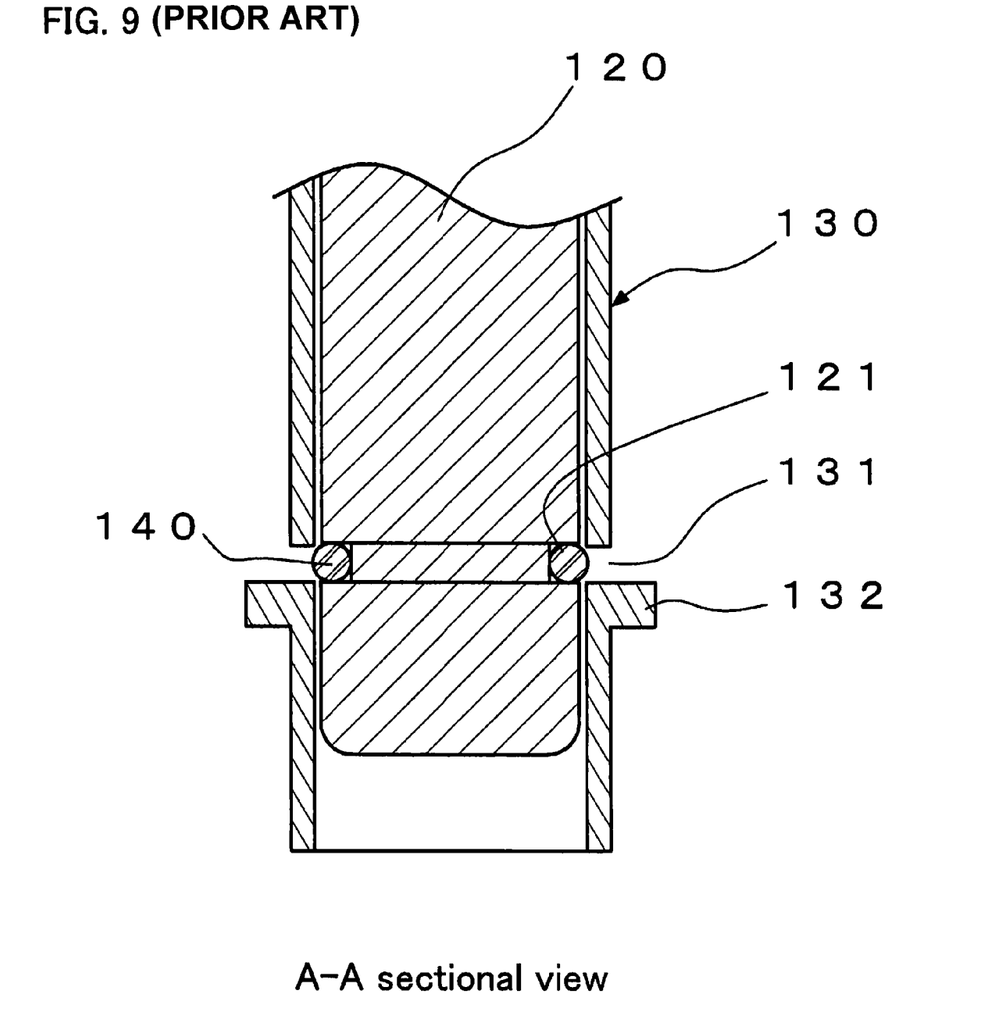
FIG. 9 is a sectional view of major parts by the line A-A of FIG. 8.

In general, a technique for fixing the headrest is already known. For example, FIGS. 8 and 9 show one example thereof. FIG. 8 is an exploded perspective view of a guide lock showing a conventional example, and FIG. 9 is a sectional view of major parts by the section line A-A of FIG. 8.

As shown in FIGS. 8 and 9, in the conventional technique, a headrest guide (not shown) of a headrest pillar 120 is arranged in a backrest frame. The headrest pillar 120 is fixed to this headrest guide at a predetermined position by way of a dedicated guide lock 130 and a lock spring 140.

That is, a groove portion 121 that engages with the lock spring 140 is formed in the headrest pillar 120, and a retaining portion 141 is formed in the lock spring 140 to fit on the outer peripheral side of the guide lock 130. Part of this retaining portion 141 is formed as a curved portion 142 biasing in the inner direction of the guide lock 130.

A cutout 131 is formed at a predetermined position of the hollow guide lock 130 formed into a predetermined shape. The headrest pillar 120 is inserted into the guide lock 130, and the cutout 131 of the dedicated guide lock 130 is matched with the groove portion 121 of the headrest pillar 120. Then, by installing the curved portion 142 of the lock spring 140 in this cutout 131, the lock spring 140 extends on the inner side of the guide lock 130 from the cutout 131 and fits into the groove portion 121 of the headrest pillar 120 which is thus fixed.

It should be noted that in FIG. 8, the reference numerals 132 denote guides for eliminating backlash between the guide lock and the headrest guide (not shown) when the headrest guide is rectangular and the guide lock 130 is cylindrical.

There are various proposed techniques regarding a headrest capable of adjusting height of the position-adjustable headrest (for example, refer to Japanese Patent Application Publication No. 2008-119398 ("the '398 Publication) (claim 1, FIGS. 1, 2)).

The '398 Publication discloses a headrest, including a headrest support formed by a head portion, a neck portion, and a trunk portion, and supported by a bracket provided in a seat frame of a vehicle, a through hole provided in this headrest support, the through hole for fitting a headrest stay provided with a height-fixing and retaining first cutout and a height-adjusting second cutout, and an operation button capable of appearing from and disappearing into an insertion hole of the head portion of the headrest support. In this technique, a locking piece provided with a projection to be locked onto the first cutout or the second cutout is provided in the operation button of the headrest, and a spring serving for return of this locking piece is provided. By locking the projection onto the first cutout or the second cutout by operating the locking piece, the headrest stay is settable at a predetermined position. The first cutout and the second cutout are provided by depressing a surface side of the headrest stay. Such a headrest for retaining the headrest stay, height-fixing, and height-adjusting is disclosed.

However, in the above conventional technique shown in FIGS. 8 and 9, there is a need for using the dedicated lock spring 140 with the dedicated guide lock 130 for the fixing type headrest guide. In the above conventional technique, there is a need for adjusting the height to predetermined height at first, and then fixing the headrest at a height position thereof. Although the conventional technique complies with predetermined regulations, the guide lock of the headrest should be exposed before adjustment in order to fix the headrest at a position matching with a user's head within a range complying with the regulations. Thus, there is a disadvantage that a fixing position cannot actually be adjusted after assembling is done.

Further, the technique shown in the '398 Publication is a technique for position-adjusting or retaining, that is, not a technique for fixing the headrest in such a manner that the headrest does not drop from the use position as a so-called fixed fitting but a technique for adjusting. Thus, there is a need for a spring or the like as a returning mechanism, so that the number of parts is increased, and moreover, there is a need for using a specific guide lock instead of a normal guide lock (the headrest support in the '398 Publication).

SUMMARY

An object of the invention is to provide a fixing device for a headrest that fixes the headrest at a predetermined position in an unadjustable manner even after a guide lock for retaining a headrest pillar of the headrest is attached, and fixing the headrest at a predetermined position even after a seatback is formed.

Another object of the invention is to provide a fixing device for a headrest applicable to general parts such as a headrest pillar and a guide lock used in general, with the reduced number of parts.

According to a fixing device for a headrest according to various embodiments of the invention, the above problems are solved by a fixing device for a headrest engagable with a head portion of a guide lock to fix a headrest pillar for supporting a headrest main body that is inserted into the guide lock, the guide lock retained by a bracket fixed on a seatback side, the guide lock having at least the head portion and a trunk portion, wherein at least one groove portion is formed by cutting out in the headrest pillar without inclination in a radial direction, the fixing device comprising: a knob portion; a resin spring portion formed continuously to the knob portion; and an engagement plate arranged in the knob portion; the resin spring portion is formed to extend on one side of the knob portion therefrom, and provided with a space portion for expanding to surround the headrest pillar, and the engagement plate is installed in the knob portion, and formed in such a manner that a part of the engagement plate is exposed in the space portion.

In such a way, the resin spring portion is formed to extend on one side of the knob portion therefrom, and provided with the space portion for expanding to surround the headrest pillar. Thus, the headrest pillar is retained by the resin spring portion with a spring force, and, at the same time, the knob portion and the engagement plate are drawn toward the headrest pillar side. Since part of the engagement plate is exposed in the space portion, this engagement plate and the groove portion (cutout) formed in the headrest pillar are meshed with each other so that the headrest pillar is fixed to the guide lock. Therefore, even after the guide lock for retaining the headrest pillar of the headrest is attached to the seatback, or even after a cushion material and a skin material are installed in the seatback, the headrest is fixable at a predetermined position.

That is, when the fixing device is installed in the head portion of the guide lock and the headrest pillar is inserted into the space portion of the resin spring portion, the groove portion (cutout) formed in the headrest pillar and the engagement plate of the fixing device are engaged with each other, so that the headrest pillar is fixed to the guide lock. At this time, the resin spring portion expands, and the groove portion (cutout) formed in the headrest pillar and the engagement plate are fitted to each other, so that the headrest pillar is fixed to the guide lock. At the same time, the knob portion is drawn toward the headrest pillar side and closely adhered to the head portion of the guide lock, so that the headrest is in an unadjustable manner.

According to various embodiments of the fixing device, a headrest pillar and a guide lock of a conventional configuration is usable without any change. In other words, the fixing device is applicable to already-utilized parts, such as the headrest pillar and the guide lock used in general.

Favorably, the resin spring portion has a non-continuous part formed in a part extending on one side of the knob portion therefrom. Thereby, when the headrest pillar is inserted into the space portion of the resin spring portion, the resin spring portion easily expands, to permit insertion of the headrest pillar, and the headrest pillar is retained with the spring force. The non-continuous part is only required to be expandable and includes a thin portion, a pleat (accordion) portion, and a convexo-concave portion.

It is preferable when the non-continuous part of the resin spring portion is a cutout space. In such a way, when the non-continuous part of the resin spring portion is a cutout space, the non-continuous part of the resin spring portion is formable by cutting out after molding so that the non-continuous part can be simply manufactured.

Further, favorably, the non-continuous part of the resin spring portion is formed at a position opposite to the knob portion. The non-continuous part of the resin spring portion may be formed at any point where the non-continuous part can expand. However, by forming the non-continuous part at the position opposite to the knob portion, the non-continuous part can expand at a position distant from the knob portion, so that the headrest pillar is more strongly retained on the engagement plate side with the spring force.

According to this fixing device for the headrest, even after the guide lock for retaining the headrest pillar of the headrest is attached to the seatback, or even after the cushion material and the skin material are installed in the seatback, the headrest is fixable at a predetermined position as a so-called fixed fitting. Particularly due to existence of the resin spring portion, the groove portion (cutout) formed in the headrest pillar and the engagement plate are fitted to each other, so that the headrest pillar is fixed to the guide lock. At the same time, the knob portion is drawn toward the headrest pillar side, and the knob portion is fitted in a state where the knob portion is always biased toward the headrest pillar side, so that the headrest is fixed in an unadjustable manner. According to this fixing device, a headrest pillar and a guide lock of a conventional configuration is usable without any change. In other words, the fixing device is applicable to already-utilized parts such as the headrest pillar and the guide lock used in general without making specific parts separately.

A vehicle headrest system comprising the fixing device described above is also provided.

BRIEF DESCRIPTION OF THE DRAWINGS

The following illustrative figures show various embodiments of the invention.

DETAILED DESCRIPTION

Hereinafter, an embodiment of the present invention will be described based on the drawings. It should be noted that members, arrangement, and the like described below do not limit the present invention but can variously be modified within a range of the gist of the present invention.

Figure 1:
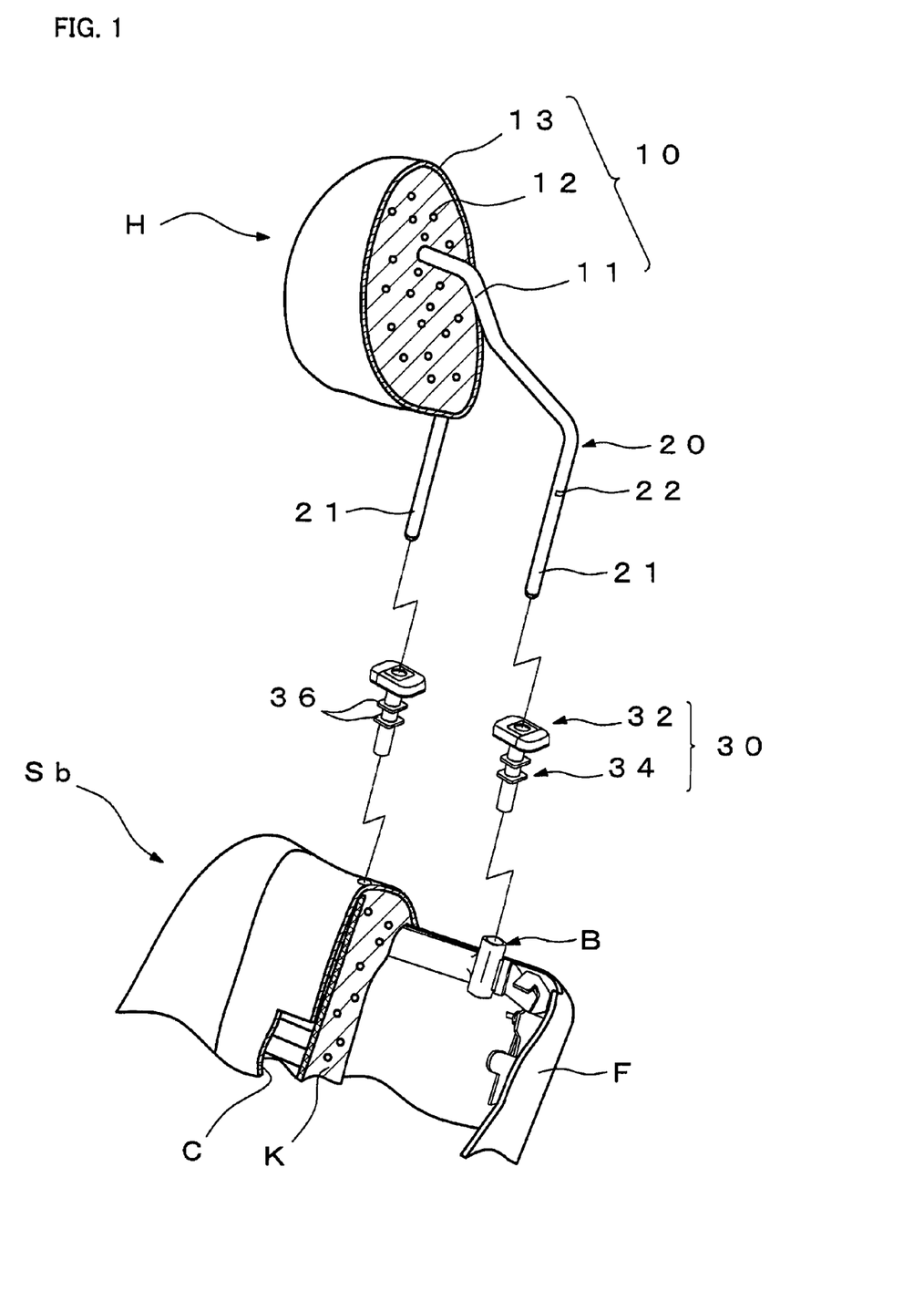
FIG. 1 is an exploded perspective cutaway view showing a schematic configuration of a headrest according to an embodiment.

FIGS. 1 to 7 show an embodiment of the invention. As illustrated in FIG. 1, a headrest H is formed by a headrest main body 10, and a headrest pillar 20. The headrest main body 10 is formed by providing inside a core 11 which is covered with a skin 13 through a cushion material 12. This headrest main body 10 and the headrest pillar 20 are coupled to each other and arranged in an upper part of a seatback Sb. In the present embodiment, the headrest pillar 20 and the core 11 are formed by an identical rod body. However, the present invention is not limited to this—a part of the core 11 can variously be formed. The headrest main body 10 is not particularly related to elements of the present invention. A fixing device S for the headrest H is applicable to a known configuration other than the above configuration.

Figure 7:
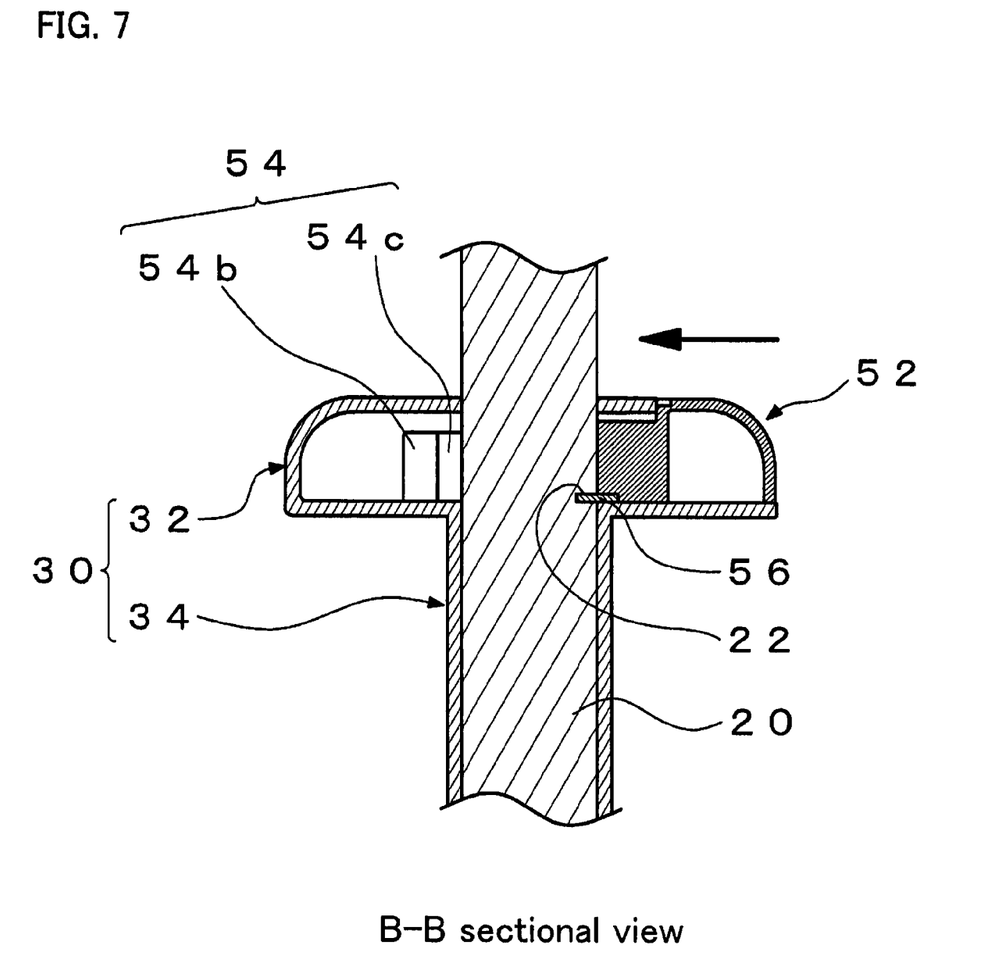
FIG. 7 A sectional view by the line B-B of FIG. 4.

The headrest pillar 20 is fixed to the seatback Sb side. The seatback Sb is formed by arranging a cushion material K in a seat frame F and covering the cushion material with a skin material C. The headrest pillar 20 is formed by two columnar rod bodies 21, 21, and a groove portion (cutout) 22 is formed in at least one of the rod bodies at a predetermined position. Although formed as the groove portion (cutout) 22 in the present embodiment, this groove portion 22 is formed as a concave portion by substantially parallel walls without inclination from a groove bottom as shown in FIGS. 5 and 7.

In the present embodiment, hollow brackets B are fixed in the seat frame F on the seatback Sb side, and guide locks 30 are installed in the brackets B. Each of the guide locks 30 of the present embodiment has a head portion 32 and a trunk portion 34. The trunk portion 34 is formed into a hollow cylinder shape into which the headrest pillar 20 is inserted, and installed in the bracket B. The reference numeral 36 denotes a guide portion for eliminating backlash of the guide lock 30 in the bracket B.

Figure 5:
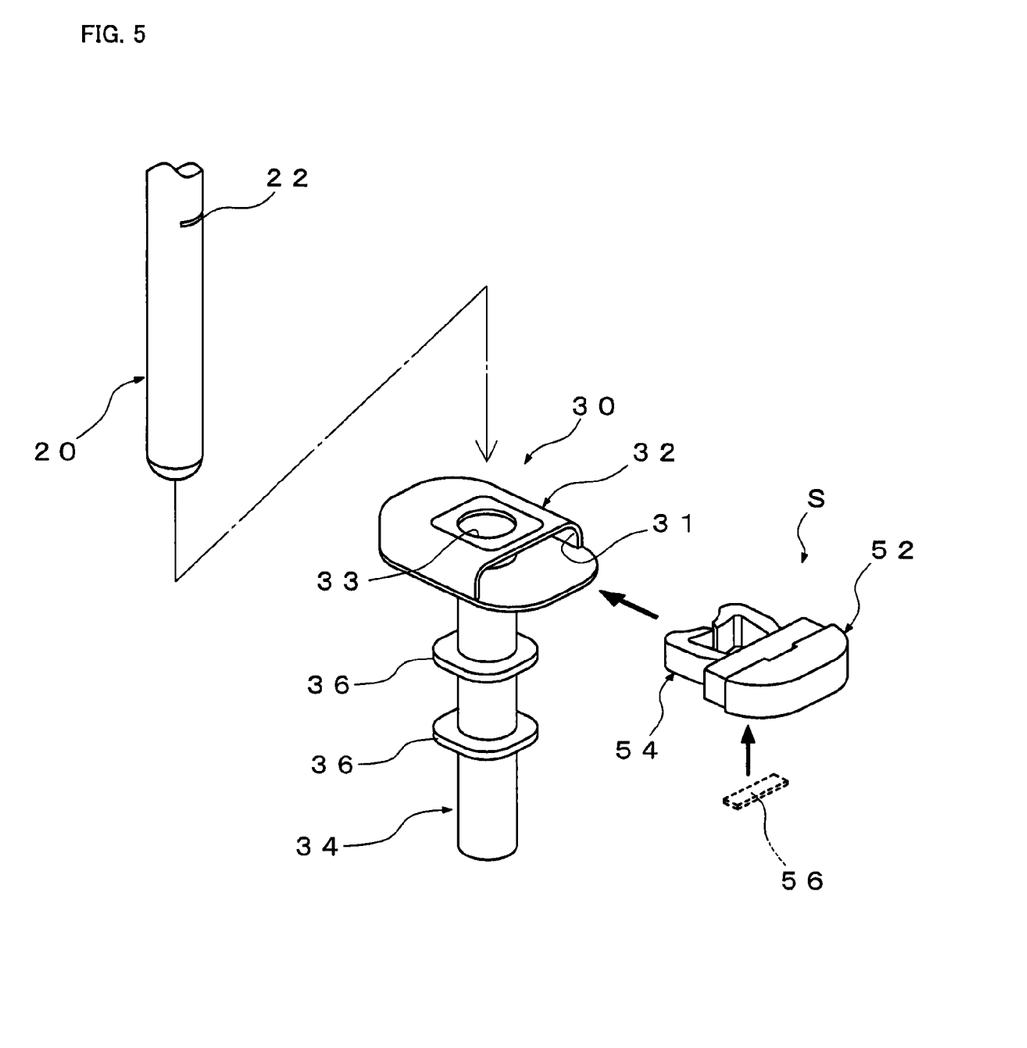
FIG. 5 is a perspective exploded view of the knob portion being installed in the headrest pillar.
Figure 6:
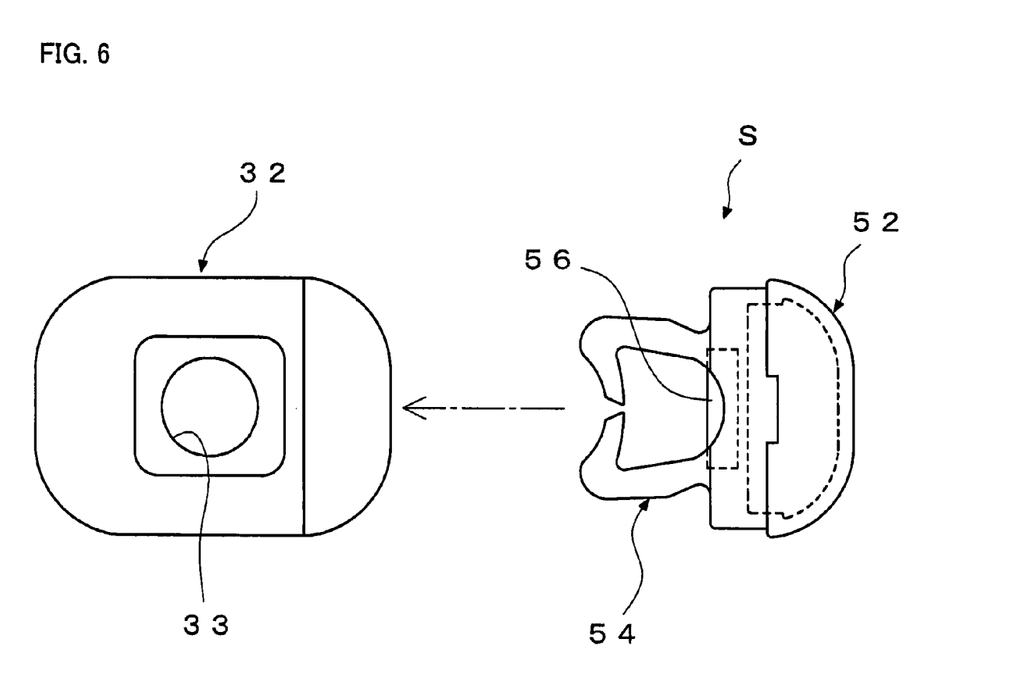
FIG. 6 is a top illustrative view of the knob portion being installed in the headrest pillar.

As shown in FIG. 5, in the guide lock 30, an opening portion 31 having a bottom to be fitted to the fixing device S for the headrest is formed in the horizontal direction in the head portion 32, and a through hole 33 is formed in a center part in such a manner that the headrest pillar 20 coupled to the headrest main body 10 is installed.

The fixing device S for the headrest is engaged with the head portion 32 of the guide lock 30 to fix the headrest pillar 20 inserted into the guide lock 30. The fixing device S has a knob portion 52, a resin spring portion 54, and an engagement plate 56 as constituent elements.

As shown in FIGS. 2 to 7, a handle 52a, and an engagement portion 52b continuous to this handle 52a are formed in the knob portion 52. This engagement portion 52b is formed to have narrower width than the handle 52a. The engagement portion 52b is engaged with the opening portion 31 of the above head portion 32. A contact portion 52c that is abutted with the headrest pillar 20 when the headrest pillar 20 is inserted is formed in this engagement portion 52b. This contact portion 52c is formed into an arc shape to fit an outer periphery of the rod body 21 forming the headrest pillar 20.

Figure 2:
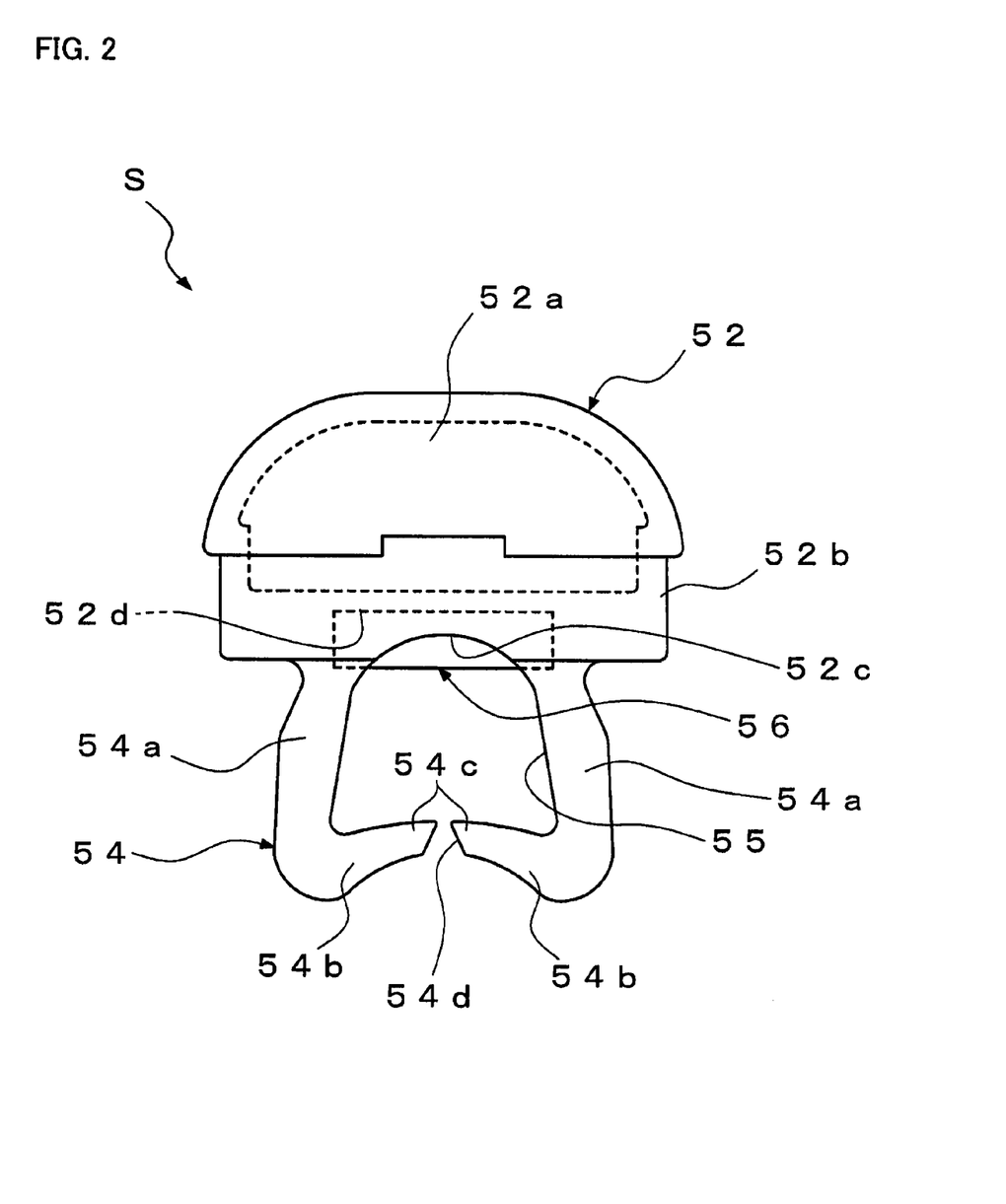
FIG. 2 is a plan view of a knob portion.
Figure 3:
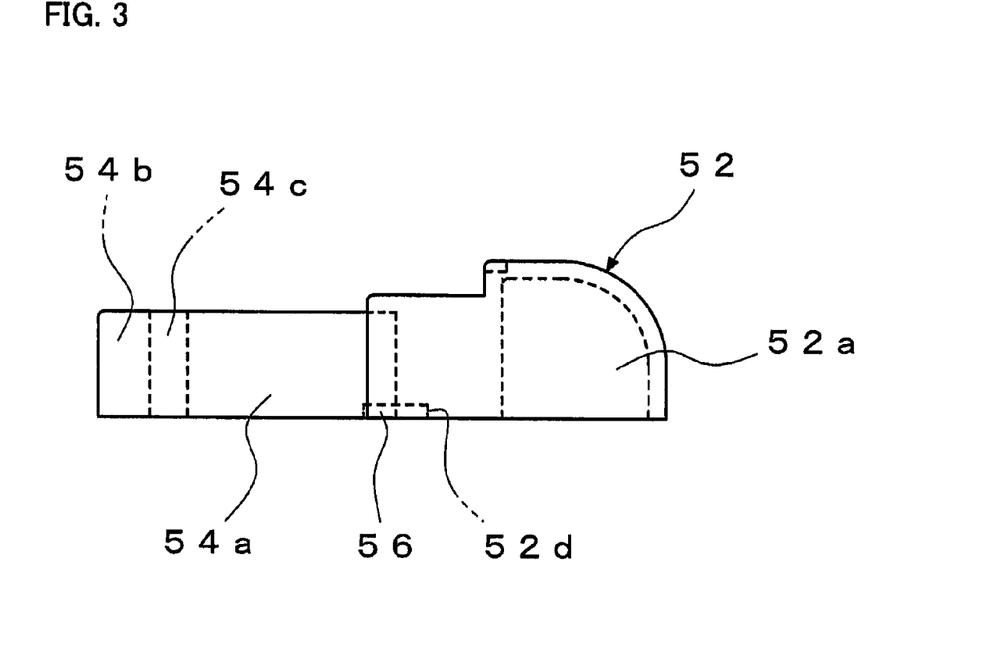
FIG. 3 is a side view of the knob portion.

The resin spring portion 54 extends on one side of both sides of the contact portion 52c formed in the knob portion 52, therefrom. A space portion 55 is formed inside this resin spring portion 54. As shown in FIG. 2, the resin spring portion 54 of the present embodiment is formed to extend in such a manner that two arm portions 54a, 54a slightly open from both the sides of the contact portion 52c, and bent portions 54b, 54b are formed to face each other at predetermined positions. Each of the bent portions 54b, 54b is formed into a taper shape toward the end side in the extending direction and slightly toward the contact portion 52c side. Front ends 54c, 54c thereof face each other, and a cutout space 54d serving as a non-continuous part is formed between the front ends 54c, 54c of the two arm portions 54a, 54a.

Figure 4:
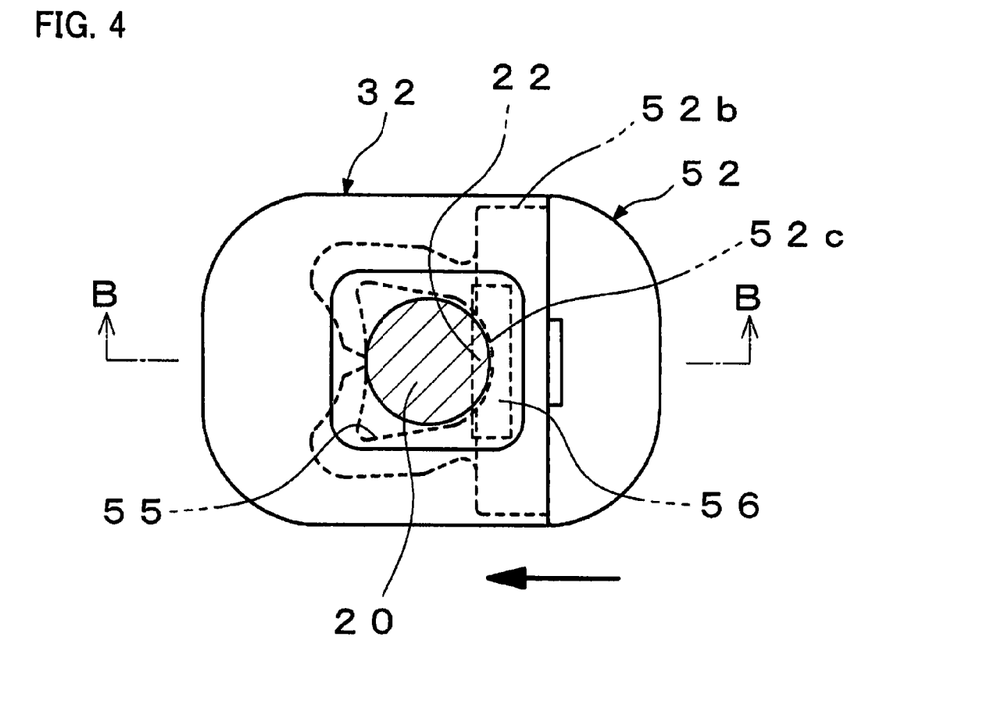
FIG. 4 is a top illustrative view of the knob portion installed in a headrest pillar.

Thereby, when the headrest pillar 20 is inserted into the space portion 55 of the resin spring portion 54, the resin spring portion 54 easily expands by the two arm portions 54a, 54a and the bent portions 54b, 54b, permitting the headrest pillar 20 to be inserted, the headrest pillar 20 is retained with spring force, and at the same time, the knob portion 52 is drawn toward the headrest pillar 20 side as shown by arrows in FIGS. 4 and 7.

When the non-continuous part of the resin spring portion 54 is the cutout space 54d, the non-continuous part of the resin spring portion 54 if formable by cutting out after molding so that the non-continuous part can be simply manufactured.

The non-continuous part is only required to be expandable and includes a thin portion, a pleat (accordion) portion, and a convexo-concave portion.

Although the non-continuous part of the resin spring portion 54 is formed at a position opposite to the knob portion 52 as in FIG. 2, the present invention is not limited to this. The non-continuous part of the resin spring portion 54 may be formed at any point where the non-continuous part can expand. However, by forming the non-continuous part at the position opposite to the knob portion 52 as in the embodiment shown in FIG. 2, the non-continuous part can expand at a position distant from the knob portion 52, so that the headrest pillar is more strongly retained on the engagement plate 56 side with the spring force.

When the headrest pillar 20 is inserted, the space portion 55 expands, so that a space surrounding the headrest pillar 20 is formed.

An arrangement portion 52d in which the engagement plate 56 is arranged is formed in the knob portion 52. The engagement plate 56 is installed in the knob portion 52 at a position of this arrangement portion 52d. The engagement plate 56 of the present embodiment is formed by a rectangular plate body. As shown in FIG. 2, the engagement plate 56 is arranged in such a manner that part of the engagement plate 56 is exposed in the space portion 55.

Therefore, as shown in FIG. 4, the groove portion (cutout) 22 formed in the headrest pillar 20 is meshed with the engagement plate 56, so that the headrest pillar 20 is fixed to the guide lock 30 (as a fixed fitting). FIG. 4 is the illustrative view of a state where the headrest pillar 20 is cut at an upper position of the head portion 32 of the guide lock 30 seen from the upper side.

The engagement plate 56 of the present embodiment is formed by a rectangular plate body. However, the engagement plate may be a body other than the rectangular plate body as long as part of the engagement plate 56 is exposed in the space portion 55 and meshed with the groove portion (cutout) 22 formed in the headrest pillar 20 to perform locking.

With the above configuration, the resin spring portion 54 is formed to extend on one side of the knob portion 52 therefrom, and provided with the space portion 55 for expanding to surround the headrest pillar 20. Thus, the headrest pillar 20 is retained by the resin spring portion 54 with the spring force, and at the same time, the knob portion 52 and the engagement plate 56 are drawn toward the headrest pillar 20 side by this resin spring portion 54. Consequently, the knob portion 52 can reliably be fitted to the head portion 32 of the guide lock 30. In such a way, when the fixing device S of the present embodiment is installed in the head portion 32 of the guide lock 30, and the headrest pillar 20 is inserted into the hole 33 of the head portion 32 of the guide lock 30, the headrest pillar is also inserted into the space portion 55 of the resin spring portion 54. At this time, the resin spring portion 54 expands, and the groove portion (cutout) 22 formed in the headrest pillar 20 and the engagement plate 56 are fitted to each other, so that the headrest pillar 20 is fixed to the guide lock 30. At the same time, the knob portion 52 is drawn toward the headrest pillar 20 side, so that the headrest is fixed in an unadjustable manner.

That is, since part of the engagement plate 56 is exposed in the space portion 55, this engagement plate 56 and the groove portion (cutout) 22 formed in the headrest pillar 20 are meshed with each other so that the headrest pillar 20 is fixed to the guide lock 30. Therefore, even after the guide lock 30 for retaining the headrest pillar 20 of the headrest H is attached to the seatback Sb, or even after the cushion material K and the skin material C are installed in the seatback Sb, the headrest H is fixable at a predetermined position.

According to the fixing device S, a headrest pillar and a guide lock of a conventional configuration is usable without any change. In other words, the fixing device is applicable to already-utilized parts such as the headrest pillar and the guide lock used in general. Although, in the above embodiment, the fixing device S applied to one of the two headrest pillars 20, the fixing device S may be applied to both of the two headrest pillars 20.

Once the headrest pillar 20 is fixed to the guide lock 30 by the fixing device S, a fixing state cannot be cancelled unless the engagement plate 56 engaged with a part of the headrest pillar 20 and the guide lock 30 is removed. Thus, a user cannot actually change height of the headrest H.

With this fixing device, the headrest is settable in an unadjustable manner. Thus, the fixing device is utilized as way for fixing the headrest including a vehicle headrest at a predetermined position.

| TABLE OF REFERENCE CHARACTERS | |
|---|---|
| 10: | Headrest main body |
| 11: | Core |
| 12: | Cushion material |
| 13: | Skin |
| 20, 120: | Headrest pillar |
| 21: | Rod body |
| 22, 121: | Groove portion (cutout) |
| 30, 130: | Guide lock |
| 31: | Opening portion |
| 32: | Head portion |
| 33: | Hole |
| 34: | Trunk portion |
| 36: | Guide portion |
| 52: | Knob portion |
| 52a: | Handle |
| 52b: | Engagement portion |
| 52c: | Contact portion |
| 52d: | Arrangement portion |
| 54: | Resin spring portion |
| 54a: | Arm portion |
| 54b: | Bent portion |
| 54c: | Front end |
| 54d: | Cutout space |
| 55: | Space portion |
| 56: | Engagement plate |
| 131: | Cutout |
| 132: | Guide |
| 140: | Lock spring |
| 141: | Retaining portion |
| 142: | Bent portion |
| B: | Bracket |
| C: | Skin material |
| F: | Seat frame |
| H: | Headrest |
| K: | Cushion material |
| Sb: | Seatback |
| S: | Fixing device |

The invention claimed is:

1. A fixing device for a headrest engageable with a head portion of a guide lock to fix a headrest pillar for supporting a headrest main body that is inserted into the guide lock, the guide lock retained by a bracket fixed on a seatback side, the guide lock having at least the head portion and a trunk portion, wherein at least one groove portion is formed by cutting out in the headrest pillar without inclination in a radial direction, the fixing device comprising:
 a knob portion;
 a resin spring portion formed continuously to the knob portion; and
 an engagement plate arranged in the knob portion and engageable with the groove portion of the headrest pillar;
wherein:
 the resin spring portion is formed to extend on one side of the knob portion therefrom, and is expandable to surround the headrest pillar when the headrest pillar is inserted into a space portion defined by the resin spring;
 the knob portion includes an engagement portion engageable with the head portion of the guide lock;
 the engagement plate is installed in the knob portion, and formed in such a manner that a part of the engagement plate is exposed in the space portion;
 the resin spring portion comprises an arm portion that extends on the one side of the knob portion and a bent portion that is bent and extends integrally from the arm portion toward the knob portion; and
 a front end portion of the bent portion of the resin spring portion contacts the headrest pillar so that the bent portion biases the knob portion toward the headrest pillar by spring force of the bent portion.

2. The fixing device for the headrest according to claim 1, wherein:
 the knob portion comprises an arc portion formed into an arc shape at a space portion side and at a position opposite to the bent portion relative to the space portion.

3. The fixing device for the headrest according to claim 1, wherein the resin spring portion extends outward relative to the space portion from the knob portion.

4. The fixing device for the headrest according to claim 1, wherein an outer edge of the outside and an outer edge of the inside of the resin spring portion extends outward relative to the space portion from the knob portion.

* * * * *